United States Patent Office 3,677,945
Patented July 18, 1972

3,677,945
STABILIZATION OF LUBRICANTS
Allen K. Sparks, Des Plaines, Ill., assignor to Universal Oil Products Company, Des Plaines, Ill.
No Drawing. Continuation-in-part of application Ser. No. 843,852, July 22, 1969, now Patent No. 3,629,190, which is a continuation-in-part of application Ser. No. 623,805, Mar. 17, 1967, now Patent No. 3,481,978. This application Mar. 12, 1971, Ser. No. 123,820
Int. Cl. C10m 1/54
U.S. Cl. 252—49.6
6 Claims

ABSTRACT OF THE DISCLOSURE

Stabilizing lubricants against deterioration during transportation, storage and/or use by incorporating therein a 2-hydrocarbyl-1,3-di-sec-alkyl or di-cycloalkyl-2H-1,3,2-benzodiazoborole.

CROSS REFERENCE TO RELATED APPLICATIONS

This is a continuation-of-part of copending application Ser. No. 843,852, filed July 22, 1969 and now Patent 3,629,190, issued Dec. 21, 1971, which, in turn, is a continuation-of-part of application Ser. No. 623,805, filed Mar. 17, 1967, and now Pat. 3,481,978, issued Dec. 2, 1969.

DESCRIPTION

This invention relates to the stabilization of lubricants by incorporating therein an additive comprising a particularly substituted benzodiazoborole.

The additive of the present invention is illustrated by the following formula

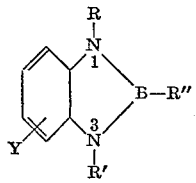

where R, and R' are sec-alkyl or cycloalkyl, R" is hydrocarbyl, and Y is hydrogen, hydrocarbyl, hydrocarbyloxy, halogen or nitro.

It is an essential feature of the present invention that R and R' are of secondary alkyl configuration or cycloalkyl. These compounds possess improved potency as additives to organic substrates. The sec-alkyl groups may contain from 3 to 20 carbon atoms each and thus will be selected from isopropyl, sec-butyl, sec-pentyl, sec-hexyl, sec-heptyl, sec-octyl, sec-nonyl, sec-decyl, sec-undecyl, sec-dodecyl, sec-tridecyl, sec-tetradecyl, sec-pentadecyl, sec-hexadecyl, sec-heptadecyl, sec-octadecyl, sec-nonadecyl and sec-eicosyl. The cycloalkyl groups may contain from 3 to 12 carbon atoms each and, in a particularly preferred embodiment, comprises cyclohexyl.

Referring to the above formula, R" is hydrocarbyl and will be selected from alkyl, alkaryl, aryl, aralkyl or cycloalkyl. The alkyl moiety may be of primary, secondary or tertiary configuration and will contain from 1 to 20 carbon atoms or more. Where R" is aryl, it will be selected from phenyl, naphthyl, anthracyl, etc., and may contain alkyl substituents attached to the aryl nucleus. Thus, the alkaryl groups may comprise toluene, ethyl benzene, propyl benzene, etc., in which the alkyl moiety contains up to about 20 carbon atoms. Also the alkaryl substitution may contain two alkyl groups attached to the aryl nucleus and thus may include xylene, diethyl benzene, dipropyl benzene, etc., in which each alkyl group may contain from 1 to 20 carbon atoms and may be the same or of a different number of carbon atoms and/or of configuration. Where R" is aralkyl, illustrative groups include benzyl, phenylpropyl, phenylbutyl, phenylpentyl, phenylhexyl, phenylheptyl, phenyloctyl, etc., which group also may contain one or two alkyl substituents attached to the phenyl nucleus. Where R" is cycloalkyl, the alkyl group contains from 3 to 12 carbon atoms in the ring and thus will be selected from cyclopropyl, cyclobutyl, cyclopentyl, cyclohexyl, cycloheptyl, cyclooctyl, cyclononyl, cyclodecyl, cycloundecyl and cyclododecyl. Here again, cyclohexyl is particularly preferred.

Where Y is hydrocarbyl, it may be selected from those hereinbefore specifically set forth. Where Y is hydrocarbyloxy, it may comprise alkoxy or phenoxy, the latter also may contain alkyl substituents attached to the phenyl nucleus. The hydrocarbyl moiety of the hydrocarbyloxy group will be selected from the hydrocarbyl groups hereinbefore specifically set forth. Where Y is halogen, it will be selected from chlorine, bromine, fluorine or iodine, preferably being chlorine or bromine.

Illustrative preferred compounds of the present invention include 2-nonyl-1,3-di-sec-hexyl-2H-1,3,2-benzodiazoborole,
2-nonyl-1,3-di-sec-heptyl-2H-1,3,2-benzodiazoborole,
2-nonyl-1,3-di-sec-octyl-2H-1,3,2-benzodiazoborole,
2-nonyl-1,3-di-sec-nonyl-2H-1,3,2-benzodiazoborole,
2-nonyl-1,3-di-sec-decyl-2H-1,3,2-benzodiazoborole,
2-nonyl-1,3-di-sec-undecyl-2H-1,3,2-benzodiazoborole,
2-nonyl-1,3-di-sec-dodecyl-2H-1,3,2-benzodiazoborole, etc., and corresponding compounds in which the 2-nonyl group is replaced by propyl, butyl, pentyl, hexyl, heptyl, octyl, decyl, undecyl, dodecyl, tridecyl, tetradecyl, pentadecyl, hexadecyl, heptadecyl, octadecyl, nonadecyl, eicosyl, etc. As hereinbefore set forth, the R" substitution may be of primary, secondary or tertiary alkyl configuration.

In another preferred embodiment, R" is phenyl and illustrative compounds include 2-phenyl-1,3-di-sec-hexyl-2H-1,3,2-benzodiazoborole,
2-phenyl-1,3-di-sec-heptyl-2H-1,3,2-benzodiazoborole,
2-phenyl-1,3-di-sec-octyl-2H-1,3,2-benzodiazoborole,
2-phenyl-1,3-di-sec-nonyl-2H-1,3,2-benzodiazoborole,
2-phenyl-1,3-di-sec-decyl-2H-1,3,2-benzodiazoborole,
2-phenyl-1,3-di-sec-undecyl-2H-1,3,2-benzodiazoborole,
2-phenyl-1,3-di-sec-dodecyl-2H-1,3,2-benzodiazoborole, etc. In another embodiment the phenyl group is replaced by naphthyl and illustrative compounds will correspond to those set forth above except that the phenyl group will be replaced by naphthyl.

The compounds of the present invention are prepared in any suitable manner. In a particularly preferred method, o-phenylenediamine is subjected to reductive alkylation with a ketone in the presence of hydrogen to form N,N'-di-sec-alkyl-o-phenylenediamine, which then is reacted with an alkyl or aryl boronic acid. In preparing the N,N'-di-sec-alkyl-o-phenylenediamine, the ketone used in the reductive alkylation will be selected to produce the desired sec-alkyl derivatives. For example, the di-isopropyl derivaive is prepared using acetone as the ketone, the di-sec-butyl derivative is prepared by using methyl ethyl ketone, the di-sec-pentyl derivative is prepared by using methyl propyl ketone or diethyl ketone, etc. The dicyclohexyl derivative is prepared by using cyclohexanone as the ketone. The reductive alkylation is effected in any suitable manner and, in a preferred method, the reaction is effected in the presence of a reductive alkylation catalyst. The reductive alkylation catalyst includes those containing nickel, molybdenum, platinum, palladium, etc. A preferred catalyst comprises a composite of alumina and 0.5 to 10% by weight of platinum, which catalyst may or may not contain from about 0.1 to 5% by weight of chlorine and/or fluorine. At least two mole proportions of ketone per mole proportion of o-phenylenediamine is used and preferably an excess of ketone is employed in order to insure that the desired reductive alkylation is effected and this excess may range up to 40 mole proportions of ketone per 1 mole proportion of o-phenylenediamine.

The N,N'-di-sec-alkyl-o-phenylenediamine or dicycloalkyl derivative prepared in the above manner is then reacted with alkyl or phenyl boronic acid. The reaction preferably is effected in the presence of a solvent. Any suitable solvent may be employed and preferably is an aromatic solvent, including benzene, toluene, xylene, ethyl benzene, cumene, etc. The temperature of reaction will vary with the particular solvent and may be within the range of from 80–300° C. The reaction is effected by refluxing the mixture of reactants and solvent for a sufficient time to effect completion of the reaction, which time may be within the range of from about 2 to 24 hours or more. The water formed during the reaction preferably is continuously removed. Following completion of the reaction, the novel compound of the present invention may be recovered in admixture with the solvent, or the solvent may be removed by distillation, preferably under vacuum, or in any other suitable manner.

The novel compound of the present invention generally will comprise a heavy liquid and may be used as such, but preferably will be used in solution in a suitable solvent which may include the solvent used in the reaction or it may be a different solvent. In any event the solvent will be selected to be compatible with the organic substrate into which the novel compound is to be incorporated. The solvent may be selected from hydrocarbons and particularly aromatics, as hereinbefore set forth, or paraffinic hydrocarbons including pentane, hexane, heptane, nonane, decane, etc., cycloparaffins and particularly cyclohexane, etc. The compounds of the present invention may be used in a concentration in the solvent of from 10 to 80% and preferably from 20 to 70% by weight thereof.

The compounds of the present invention are useful as additives to retard deterioration of lubricants which normally tend to deteriorate in storage, transportation and/or in use due to oxidation, ozonation, ultraviolet light absorption and/or other reactions.

The compounds of the present invention are used in the stabilization of lubricants including lubricating oils and greases. These may be either synthetic or of petroleum origin. The synthetic lubricating oils are of varied types including aliphatic esters, polyalkylene oxides, silicones, esters of phosphoric and silicic acids, highly fluorine-substituted hydrocarbons, etc. Of the aliphatic esters, di-(2-ethylhexyl)-sebacate is being used on a comparatively large commercial scale. Other aliphatic esters include dialkyl azelates, dialkyl suberates, dialkyl pimelates, dialkyl adipates, dialkyl glutarates, etc. Specific examples of these esters include dihexyl azelate, di-(2-ethylhexyl)-azelate, di-3,5,5-tri-methylhexyl glutarate, di-3,5,5-trimethylpentyl glutarate, di-(2-ethylhexyl)-pimelate, di-(2-ethylhexyl)-adipate, tri-amyl tricarballylate, pentaerythritol tetracaproate, pentaerythritol tetrapelargonate, dipropylene glycol dipelargonate, 1,5-pentanediol-di-(2-ethylhexanonate), etc. The polyalkylene oxides include polyisopropylene oxide, polyisopropylene oxide diether, polyisopropylene oxide diester, etc. The silicones include methyl silicone, ethylphenyl silicone, etc. and the silicates include, for example, tetraisooctyl silicate, etc. The highly fluorinated hydrocarbons include fluorinated oil, perfluorohydrocarbons, etc.

Additional synthetic lubricating oils include (1) neopentyl glycol esters, in which the ester group contains from 3 to 12 carbon atoms or more, and particularly neopentyl glycol propionate, neopentyl glycol butyrate, neopentyl glycol caproate, neopentyl glycol caprylate, neopentyl glycol pelargonate, etc., (2) trialkylol alkane esters such as the esters of trimethyol alkanes including trimethylol ethane, trimethylolpropane, trimethylolbutane, trimethylolpentane, trimethylolhexane, trimethylolheptane, trimethyloloctane, trimethylolnonane, trimethyloldacane, trimethylol, undecane, trimethyloldodecane, etc., and particularly triesters in which the ester portions each contain from 3 to 12 carbon atoms and may be selected from those hereinbefore specifically set forth in connection with the discussion of the neopentyl glycol esters, and (3) tricresylphosphate, triphenylphosphate, trioctylphosphate, trinonylphosphate, tridecylphosphate, as well as mixed aryl and alkyl phosphates, etc.

The lubricating oils of petroleum origin include those referred to as motor lubricating oil, railroad type lubricating oil, marine oil, transformer oil, turbine oil, transmission oil, differential oil, diesel lubricating oil, gear oil, cutting oil, rolling oil, cylinder oil, hydraulic oil, slushing oil, specialty products oil, etc.

The synthetic greases generally are referred to as lithium base grease, sodium base grease, calcium base grease, barium base grease, strontium base grease, aluminum base grease, etc. These greases are solid or semi-solid gels and, in general, are prepared by the addition to mineral and/or synthetic oil of hydrocarbon-soluble metal soaps or salts of higher fatty acids as, for example, lithium stearate, calcium stearate, aluminum naphthenate, etc. The grease may contain thickening agents such as silica, carbon black, polyacrylates, talc, etc. Another type of grease is prepared from oxidized petroleum wax, to which the saponifiable base is combined with the proper amount of the desired saponifying agent, and the resultant mixture processed to produce a grease. Other types of greases in which the features of the present invention are usable include petroleum grease, whale grease, wool grease, etc., and those made from inedible fats, tallow, butcher's waste, etc.

The compounds of the present invention may be used in a concentration of from about 0.001% to about 20% and more particularly from about 0.1% to about 5% by weight of the lubricant. The exact concentration to be used will depend upon the particular lubricant being stabilized.

It is understood that the compound of the present invention may be used along with other additives incorporated in the organic substance. For example, in grease it may be used along with higher alcohols, esters, organic amines, polybutene, sulfurized fatty materials, sulfur chlorine compounds molybdenum disulfide, dyes, perfumed materials, fillers, etc. In lubricating oil, it may be used along with one or more of the above additives and/or viscosity index improver, pourpoint depressor, anti-foaming agent, detergent, lubricity or extreme pressure additive, etc. In some cases, it may be of advantage to also include a metal deactivator as, for example disalicylal diaminopropane, ethylene diamine tetraacetic acid tetrasodium salt, etc., or to include other additives such as tricresyl phosphate, trialkyl phenols including 2,6-di-tert-butyl-4-methylphenol, 2,4-dimethyl-6-tert-butylphenol, alkylated diphenyl amines, phenyl naphthyl amines, dialkyl phenylenediamines, phenothiazine, organic selenium compounds, etc. When desired, the compound of the present invention may be prepared as a mixture with one or more of these other additives and incorporated in this manner in the lubricant.

The compound of the present invention may be incorporated in the lubricant in any suitable manner and at any suitable stage of preparation. For example, in grease, the compound may be added to one or more of the components of the grease prior to compositing and processing thereof, or it may be added to the mix at any time, preferably before final processing in order to obtain intimate mixing and dissolving of the compound in the grease. When added to lubricating oil, the compound is incorporated in any suitable manner and preferably with mixing to obtain uniform distribution in the oil.

The following examples are introduced to illustrate further the novelty and utility of the present invention, but not with the intention of unduly limiting the same.

EXAMPLE I

The compound of this example is 2-nonyl-1,3-di-sec-octyl-2H-1,3,2-benzodiazoborole and was prepared by reacting nonyl boronic acid with N,N'-di-sec-octyl-o-phenylenediamine, the latter being prepared by reductive alkylation of o-phenylenediamine with octyl ketone at about 160° C., 100 atmospheres of hydrogen and in contact with an alumina-platinum catalyst. The reaction was effected by refluxing a mixture of 37 g. of N,N'-di-sec-octyl-o-phenylenediamine, 23 g. of nonyl boronic acid and 250 cc. of benzene. The refluxing was continued for 6 hours, and 2.5 cc. of water was recovered from the distillation. Following completion of the reaction, 56 g. of 2-nonyl-1,3-di-sec-octyl-2H-1,3,2 - benzodiazoborole was recovered as a reddish liquid. This corresponds to the theoretical yield of 56.9 g. Analysis of the product found a boron content of 2.35% by weight and basic nitrogen of 1.97 meq./g. which equals a molecular weight of 507.6 and corresponds to the theoretical molecular weight of 513.5.

EXAMPLE II

The compound of this example is 2-phenyl-1,3-di-sec-butyl-2H-1,3,2-benzodiazoborole and is prepared by first subjecting o-phenylenediamine to reductive alkylation with methyl ethyl ketone and then reacting 1 mole proportion of the N,N'-di-sec-butyl-o-phenylenediamine with phenyl boronic acid. The latter reaction is effected by refluxing the reactants in the presence of benzene solvent and removing the water formed in the reaction. After completion of the reaction 2-phenyl-1,3-di-sec-butyl-2H-1,3,2-benzodiazoborole is recovered in admixture with the benzene solvent and is utilized in this manner as an additive to organic substrates.

EXAMPLE III

The compound of this example is 2-cyclohexyl-1,3-di-sec-hexyl-2H-1,3,2-benzodiazoborole and is prepared by first subjecting o-phenylenediamine to reductive alkylation with ethyl propyl ketone to form N,N'-di-sec-hexyl-o-phenylene diamine and then reacting the same with cyclohexyl boronic acid in the presence of toluene solvent under refluxing conditions for 8 hours. The 2-cyclohexyl-1,3-di-sec-hexyl-2H-1,3,2-benzodiazoborole is recovered in admixture with the toluene solvent and is utilized in this manner.

EXAMPLE IV

The compound of this example is 2-decyl-1,3-di-cyclohexyl-2H-1,3,2-benzodiazoborole and is prepared by first reductively alkylating o-phenylenediamine with cyclohexanone to form N,N'-di-cyclohexyl-o-phenylenediamine and then reacting the same with decyl boronic acid in the presence of benzene solvent under refluxing conditions for 7 hours. The resultant 2-decyl-1,3-di-cyclohexyl-2H-1,3,2-benzodiazoborole is recovered in admixture with the benzene solvent and is used in this manner as an additive.

EXAMPLE V

The compound of this example is 2-naphthyl-1,3-di-isopropyl-2H-1,3,2-diazoborole and is prepared by first subjecting o-phenylenediamine to reductive alkylation with acetone and then reacting one mole proportion of the N,N-diisopropyl-o-phenylenediamine with naphthyl boronic acid. The later reaction is effected by refluxing the reactants in the presence of xylene solvent and removing the water formed during the reaction. After completion of the reaction, 2-naphthyl-1,3-di-isopropyl-2H-1,3,2-benzodiazoborole is recovered in admixture with xylene solvent and is utilized in this manner as an additive to organic substrates.

EXAMPLE VI

The compound of this example is 2-cyclooctyl-1,3-di-stearyl-2H-1,3,2-benzodiazoborole and is prepared in substantially the same manner as described above by first subjecting o-phenylenediamine to reductive alkylation with ethylpentadecyl ketone and then reacting the same with cyclooctyl boronic acid in the presence of xylene solvent. The 2-cyclooctyl-1,3-di-stearyl-2H-1,3,2-benzodiazoborole is recovered in admixture with the solvent.

EXAMPLE VII

This example illustrates the use of 2-nonyl-1,3-di-sec-octyl-2H-1,3,2-benzodiazoborole, prepared as described in Example I, as an additive in lubricating oil. The lubricating oil used in this example is a synthetic lubricating oil marketed under the trade name of "Plexol 201" and is dioctyl sebacate.

The lubricating oil was evaluated in accordance with a standard oxygen stability test in which a 100 cc. sample of the lubricating oil is placed in a batch maintained at 204° C, and air is blown therethrough at a rate of 5 liters of air per hour. The test is continued for 48 hours. The kinematic viscosities at the start of the test, after 24 hours and after 48 hours were determined. In addition, the percent of isooctane insoluble materials was determined.

The following table reports the results of an evaluation of the control sample of the lubricating oil (not containing the additive) and a sample of the lubricating oil containing 2% by weight of 2-nonyl-1,3-di-sec-octyl-2H-1,3,2-benzodiazoborole.

TABLE I

| | Control sample | | | Sample with additive | | |
|---|---|---|---|---|---|---|
| | Start | 24 hr. | 48 hr. | Start | 24 hr. | 48 hr. |
| Kinematic viscosity | 7.958 | 11.39 | 16.73 | 8.106 | 8.636 | 8.878 |
| Percent increase | | 49 | 100 | | 6 | 9.5 |

From the data in the above table it will be seen that the control sample of the lubricating oil (without additive) underwent an increase of approximately 100% in kinematic viscosity. In contrast, the sample containing the additive underwent an increase of less than 10% in kinematic viscosity.

In the control sample, the percent of material insoluble in iso-octane was 8.2%. In contrast the percent of iso-octane insolubles in the sample containing the additive was 0.1%. This again demonstrates the effectiveness of the compound of the present invention to retard deleterious reactions in the lubricating oil during evaluation in the above manner.

EXAMPLE VIII

In this example 2-cyclohexyl-1,3-di-sec-hexyl-2H-1,3,2-benzodiazoborole, prepared as described in Example III, is utilized in a concentration of 1% by weight as an additive in grease. The compound is incorporated in a commercial Mid-Continent lubricating oil having an SAE viscosity of 20. Approximately 92% of the lubricating oil then is mixed with approximately 8% by weight of lithium stearate. The mixture is heated to about 232° C., with constant agitation. Subsequently, the grease is cooled, while agitating, to approximately 120° C., and then the grease is further cooled slowly to room temperature.

The stability of the grease is tested in accordance with ASTM D–942 method, in which method a sample of the grease is placed in a bomb and maintained at a temperature of 100° C. Oxygen is charged to the bomb, and the time required for a drop of five pounds pressure is taken as the Induction Period. A sample of the grease without additive will reach the Induction Period in about eight hours. On the other hand, a sample of the grease containing 1% by weight of the additive of the present invention will be of substantially higher stability.

EXAMPLE IX

In this example, 2-decyl-1,3-di-cyclohexyl-2H-1,3,2-benzodiazoborole, prepared as described in Example IV, is used as an additive in commercial motor lubricating oil of petroleum origin. The additive is incorporated in a concentration of 3% by weight and serves to retard deterioration of the lubricating oil during storage and use.

I claim as my invention:

1. Lubricant selected from the group consisting of lubricating oils and greases normally tending to undergo deterioration during transportation, storage or use containing, as an inhibitor against such deterioration, a stabilizing concentration of 2-hydrocarbyl-1,3-di-$C_3$-$C_{20}$-sec-alkyl-2H-1,3,2-benzodiazoborole or 2-hydrocarbyl-1,3-di-$C_3$-$C_{12}$-cycloalkyl-2H-1,3,2-benzodiazoborole.

2. The lubricant of claim 1 being lubricating oil.

3. The lubricant of claim 1 being a solid lubricant.

4. The lubricant of claim 1 wherein the inhibitor is 2-nonyl-1,3-di-sec-octyl-2H-1,3,2-benzodiazoborole.

5. The lubricant of claim 1 wherein the inhibitor is 2-cyclohexyl-1,3-di-sec-hexyl-2H-1,3,2-benzodiazoborole.

6. The lubricant of claim 1 wherein the inhibitor is 2-decyl-1,3-di-cyclohexyl-2H-1,3,2-benzodiazoborole.

References Cited

UNITED STATES PATENTS

| | | | |
|---|---|---|---|
| 3,213,136 | 10/1965 | Washburn et al. | 252—49.6 X |
| 3,338,962 | 8/1967 | Horn | 252—49.6 X |

DANIEL E. WYMAN, Primary Examiner

W. H. CANNON, Assistant Examiner

U.S. Cl. X.R.

252—400